R. THAMM.
NAPKIN FASTENER.
APPLICATION FILED JUNE 8, 1918.

1,329,149.

Patented Jan. 27, 1920.

Inventor
Rosie Thamm.

By Harry C. Schwede
Attorney

UNITED STATES PATENT OFFICE.

ROSIE THAMM, OF BERKELEY, CALIFORNIA.

NAPKIN-FASTENER.

1,329,149.  Specification of Letters Patent.  Patented Jan. 27, 1920.

Application filed June 8, 1918. Serial No. 238,936.

*To all whom it may concern:*

Be it known that I, ROSIE THAMM, citizen of the United States, residing at Berkeley, in the county of Alameda and State of California, have invented certain new and useful Improvements in Napkin-Fasteners, of which the following is a specification.

This invention is a napkin fastener for fastening a napkin on a person in position for use. It is also a napkin holder.

The invention is illustrated in the accompanying drawing which forms a part of this specification and is pointed out in the appended claims.

Referring to the drawing.

Figure 1:
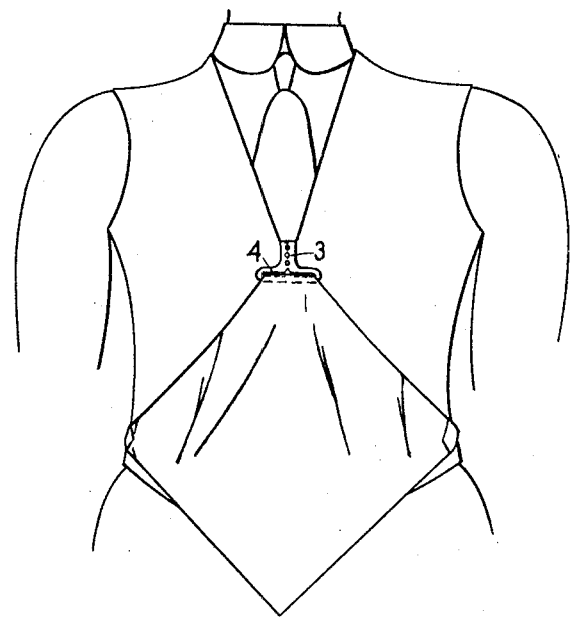
Figure 1 is a view of the invention fastening a napkin in position in a person's lap.
Figure 2:
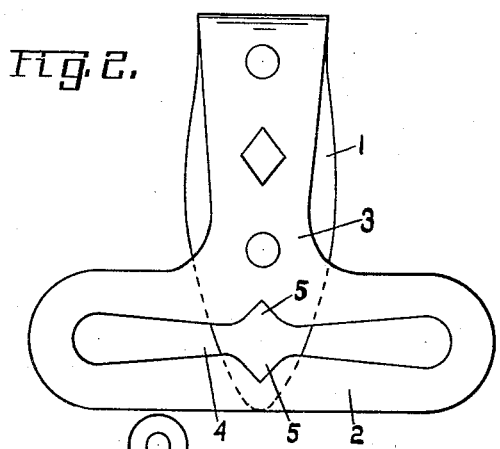
Fig. 2 is a front view of the fastener on an enlarged scale.
Figure 3:
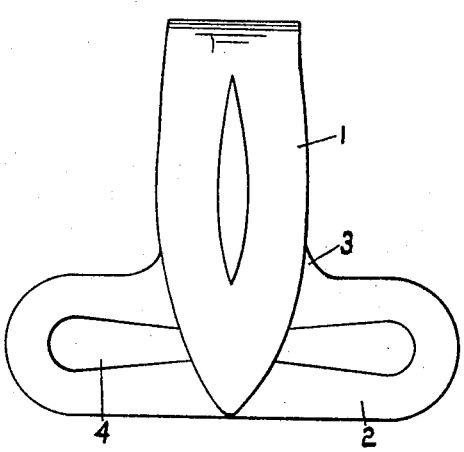
Fig. 3 is a rear view of the fastener on an enlarged scale.
Figure 4:
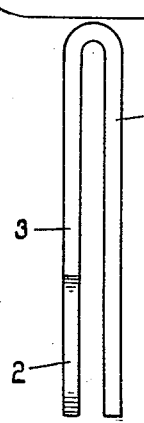
Fig. 4 is a side view of the fastener.

The fastener includes a hook 1 and a slotted napkin fastening member 2 joined midway between its ends to said hook by a neck 3, the hook having a spring action. The fastener may be stamped out of a single piece of sheet metal. The fastening member 2 is provided with a horizontal slot 4, for receiving the corner of the napkin. The slot 4 is narrower intermediate its ends than at its ends, diverging to its ends so that the ends of the slots are wide enough to allow the hemmed edges of the napkin to pass easily through them. The fastening member 2 is provided with notches 5 midway between the ends of the slot 4 through which the folded corner of the napkin may be readily inserted to draw the corner of the napkin through the slot. The fastener may be hooked by the hook 1 into the vest of the user, the corner of the napkin gripped by the spring action of the hook between the member 2 and hook 1 in position for use as shown in Fig. 1. The hook 1 is bent substantially parallel and close to the fastening member 2 and neck 3 for holding a folded napkin therebetween.

Having described my invention, what I claim as new and desire to secure by Letters Patent is:

1. A napkin fastener including means for securing the fastener to the clothes, a slotted member provided with a slot wider at its ends than intermediate its ends through which the napkin is inserted.

2. A napkin fastener including means for securing the fastener to the clothes, a slotted member provided with a slot wider at its ends than intermediate its ends through which the napkin is inserted, said member being provided with a notch intermediate the ends of said slot.

3. A napkin fastener including means for securing the fastener to the clothes, and a slotted member provided with a notch intermediate the ends of the slot of said slotted member.

In testimony whereof I affix my signature.

ROSIE THAMM.